(12) United States Patent
Rullo et al.

(10) Patent No.: US 9,382,939 B1
(45) Date of Patent: Jul. 5, 2016

(54) LINKLESS ATTACHMENT ARRANGEMENT FOR A LOCKING SNAP-HOOK OR THE LIKE

(75) Inventors: James J. Rullo, Binghamton, NY (US); DeForest C. Canfield, Oxford, NY (US)

(73) Assignee: BUCKINGHAM MANUFACTURING COMPANY, INC., Binghamton, NY (US)

(*) Notice: Subject to any disclaimer, the term of this patent is extended or adjusted under 35 U.S.C. 154(b) by 647 days.

(21) Appl. No.: 13/021,824

(22) Filed: Feb. 7, 2011

Related U.S. Application Data

(63) Continuation-in-part of application No. 12/417,674, filed on Apr. 3, 2009, now abandoned.

(51) Int. Cl.
*F16B 45/02* (2006.01)

(52) U.S. Cl.
CPC ...................... *F16B 45/02* (2013.01)

(58) Field of Classification Search
CPC ......... F16B 45/025; F16B 45/04; F16B 45/02
USPC ............... 24/599.5, 599.6, 599.9, 600.1; 294/82.19–82.21
See application file for complete search history.

(56) References Cited

U.S. PATENT DOCUMENTS

| | | | |
|---|---|---|---|
| 1,879,167 A * | 9/1932 | Freysinger | 24/599.5 |
| 3,317,972 A * | 5/1967 | Harley | 24/599.4 |
| 3,722,943 A | 3/1973 | Kalua, Jr. | |
| 3,949,451 A * | 4/1976 | Bunn | 24/599.4 |
| 5,579,564 A | 12/1996 | Rullo et al. | |
| 5,664,304 A * | 9/1997 | Tambornino | 24/599.1 |
| 5,735,025 A * | 4/1998 | Bailey | 24/600.1 |
| D407,300 S | 3/1999 | Catlett | |
| 5,896,630 A | 4/1999 | Smith et al. | |
| 5,937,490 A | 8/1999 | Mihailovic | |
| 6,161,264 A * | 12/2000 | Choate | 24/599.5 |
| 6,230,375 B1 | 5/2001 | Catlett | |
| D444,052 S | 6/2001 | Catlett | |
| 6,283,523 B1 * | 9/2001 | Simond | 294/82.2 |
| 6,283,524 B1 * | 9/2001 | Simond | 294/82.2 |
| 6,718,601 B1 | 4/2004 | Choate | |
| 6,898,829 B2 | 5/2005 | Loe et al. | |
| 7,353,572 B2 * | 4/2008 | Claus et al. | 24/600.1 |
| 7,437,806 B2 * | 10/2008 | Lin | 24/599.5 |
| 7,636,990 B1 | 12/2009 | Choate | |
| 8,007,015 B2 * | 8/2011 | Coulombe | 292/1 |
| 2008/0104809 A1 * | 5/2008 | Lin | 24/600.1 |
| 2008/0174130 A1 * | 7/2008 | Lin | 294/82.2 |
| 2008/0184540 A1 * | 8/2008 | Coulombe | 24/599.1 |
| 2009/0049663 A1 * | 2/2009 | Hong | 24/600.1 |
| 2011/0138587 A1 * | 6/2011 | Walker et al. | 24/599.5 |

FOREIGN PATENT DOCUMENTS

WO    WO95/19505    * 7/1995 ............. F16B 45/02

* cited by examiner

*Primary Examiner* — Jack W Lavinder
(74) *Attorney, Agent, or Firm* — Bond Schoeneck & King, PLLC; George McGuire; Frederick Price

(57) ABSTRACT

A linkless attachment for use with snap-hooks or similar devices. Snap-hooks typically include a locking mechanism and release mechanism requiring the simultaneous depression of interacting grips. The keeper grip member of the hook apparatus functions in a dual-purpose capacity. It forms the eye of the hook loop, and it functions as one of the grip members of the release mechanism. Further, the body member features an open attachment loop terminating in a slot, whereby various attachment devices may interchangeably be added to the novel linkless snap-hook at the time of its assembly.

3 Claims, 4 Drawing Sheets

LINKLESS ATTACHMENT ARRANGEMENT FOR A LOCKING SNAP-HOOK OR THE LIKE

RELATED PATENT

This patent application is related to a Continuation-In-Part U.S. patent application Ser. No. 12/417,674, filed Apr. 3, 2009 and is related to U.S. Pat. No. 5,579,564 for LOCKING SNAP-HOOK issued to Rullo, et al. on Dec. 3, 1996, both are hereby incorporated herein in their entirety by reference.

FIELD OF THE INVENTION

The present invention pertains to snap-hooks or similar apparatus used for securing and suspending workers and, more particularly, to a linkless apparatus for use therewith allowing direct connection of different attachment mechanisms without need of an intermediate attachment link.

BACKGROUND OF THE INVENTION

Locking snap-hooks and similar devices are well known and are used in myriad service industries. Such devices are widely used by workers in at least the electric utility, arborist and construction industries.

Most snap-hook or similar devices in use today feature locking mechanisms. Locking apparatuses have innumerable design variations. Each design, however, has as its main objective providing a snap-hook that is easily snapped into place, but which will not prematurely or unintentionally release. Although most snap-hooks work reasonably well, some hook mechanisms work better than others.

Further, snap-hook devices currently in use have an eye at an end of a body member for threading through and attaching various devices, ropes or webbings.

The present invention provides a linkless connection apparatus that is incorporated into the body of a locking snap-hook design. A unique configuration of the snap-hook body member allows direct connection of different attachment mechanisms without need of an intermediate attachment link.

DISCUSSION OF RELATED ART

In U.S. Pat. No. 3,722,943, entitled SAFETY HOOK and issued to John Kalua, Jr. on Mar. 27, 1973, a safety hook release mechanism is illustrated which has a recessed actuator. The purpose of this recessed actuator is to release the end portion of the keeper member, thus opening the hook apparatus. This apparatus reflects the need to recess the release mechanism, so as to prevent accidental or incidental opening of the keeper member. The aforementioned KALUA safety hook has several disadvantages. The release trigger is a single acting member, thus presenting greater opportunity for accidental or inadvertent actuation. Additionally, the keeper member of KALUA opens outwardly, creating greater opportunity for the keeper to be snagged or damaged.

In U.S. Pat. No. 5,579,564, entitled LOCKING SNAP-HOOK and issued to James J. Rullo et al. on Dec. 3, 1996, a safety hook is shown wherein the keeper member opens inwardly in relation to the hook eye, a distinction that provides safety advantages over the KALUA patent. This Rullo et al. actuation is dependent on the simultaneous depression of interacting grips. Except for a small, oval aperture in a sidewall member, all internal mechanisms are shielded.

U.S. Pat. No. 6,230,375 for LATCHING S HOOK, issued May 15, 2001 to Timothy J. Catlett discloses an add-on latch for use with an S-hook wherein one end of the S-hook is enclosed by the latch body.

U.S. Design Pat. Nos. D407,300 and D444,052, both for LATCHING S HOOK and issued Mar. 30, 1999 and Jun. 26, 2001 to Timothy J. Catlett, disclose a design for an add-on latch for use with an S-hook wherein one end of the S-hook is enclosed by the latch body None of these patents, taken singly or in any combination are seen to teach or suggest the novel linkless apparatus of the present invention.

The snap-hook of the present invention features a unique body member configuration allowing direct attachment of different attachment mechanisms directly to the body member without need of an intermediate connection link.

SUMMARY OF THE INVENTION

In accordance with the present invention, there is provided a linkless attachment for use with snap-hooks or similar devices. Snap-hooks typically include a locking mechanism and release mechanism requiring the simultaneous depression of interacting grips. The keeper grip member of the hook apparatus functions in a dual-purpose capacity. It forms the eye of the hook loop, and it functions as one of the grip members of the release mechanism. Further, the body member features an open attachment loop terminating in a slot, whereby various attachment devices may interchangeably be added to the novel linkless snap-hook at the time of its assembly.

BRIEF DESCRIPTION OF THE DRAWINGS

A complete understanding of the present invention may be obtained by reference to the accompanying drawings, when considered in conjunction with the subsequent detailed description, in which.

DESCRIPTION OF THE PREFERRED EMBODIMENT

The present invention features a locking snap-hook for workers in service industries. The locking snap-hook apparatus has dual-actuated, simultaneously active release grips. It's unique body member allowing selective attachment of different attachment mechanisms without need for an intermediate linking mechanism.

Figure 1:
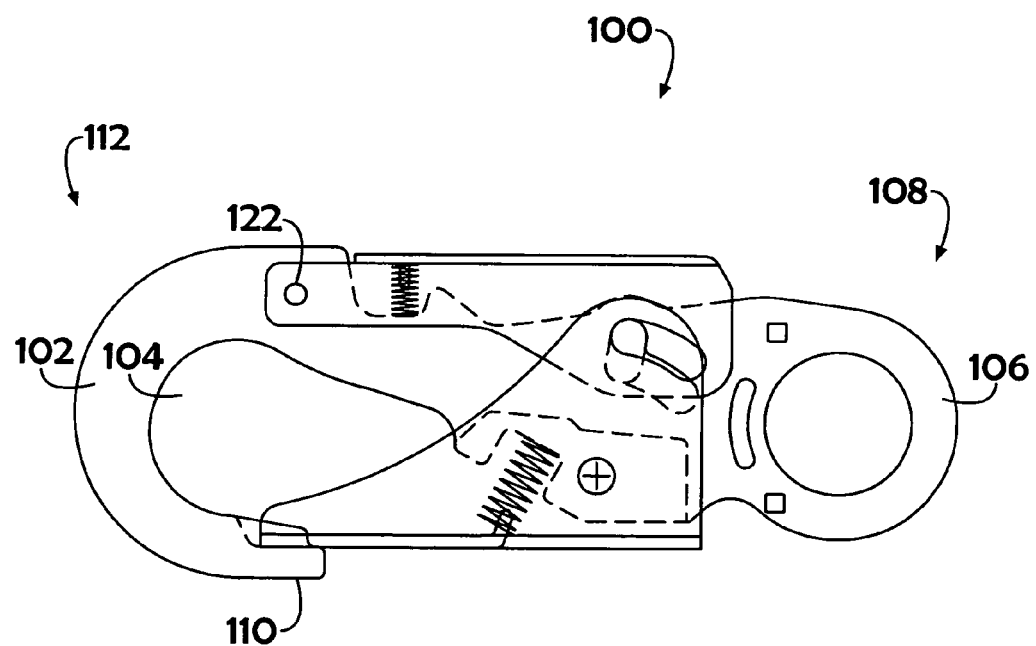
FIG. 1 illustrates a schematic plan view of a locking snap-hook without the linkless attachment features of the linkless snap-hook of the invention.

Referring first to FIG. 1, there is shown a top plan, schematic view of a snap-hook absent the linkless attachment feature of the linkless snap-hook of the invention, generally at reference number 100. Snap-hook 100 comprises a body member 102 that forms one portion of an eye loop 104 of snap-hook 100. Body member 102 has an eyelet attachment 106 disposed on one end 108 and a hook member 110 disposed on the distal end 112.

The materials used to fabricate the body portion 102 of locking snap-hook 100 are preferably forged or stamped heat-treated metal.

Figure 2A:
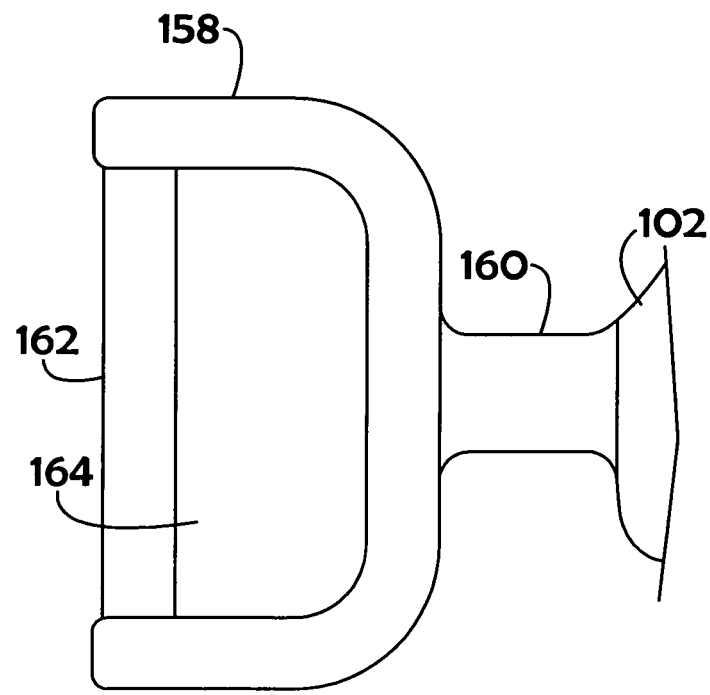
FIGS. 2a and 2b are top and side views, respectively, of an alternate embodiment of an attachment mechanism for the locking snap-hook of FIG. 1.
Figure 2B:
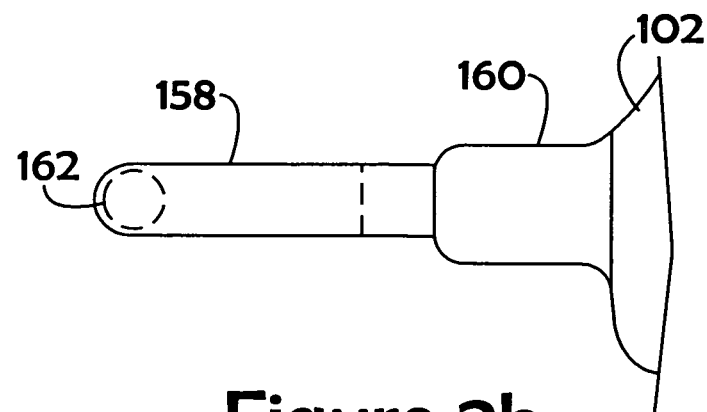

Referring now also to FIGS. 2a and 2b, there are shown top and side views, respectively, of an alternate embodiment of the attachment mechanism, replacing eyelet attachment 106 (FIG. 1). Specifically, a U-shaped member 158 is attached to body member 102 by means of a post 160. Bar 162 is fixedly attached to the distal ends of U-shaped member 158, forming a slot 164 through which a rope or webbing can be inserted. It should be noted that U-shaped member 158 is formed as an integral portion of body member 102. Consequently, for each variation of a desired attachment, a separate casting or forging is required for body member 102. This adds expense as separate tooling (e.g., molds, dies, etc.) is required for each variation. In addition, inventory for several different parts must be maintained. As discussed hereinbelow, the novel body member 202 (FIGS. 3 and 4) eliminates these expenses and provides an inexpensive approach to supplying a locking snap-hook which may accommodate any attachment configuration that may be coupled to body member 202 at the time of manufacture of the novel locking snap-hook 200.

Figure 3:
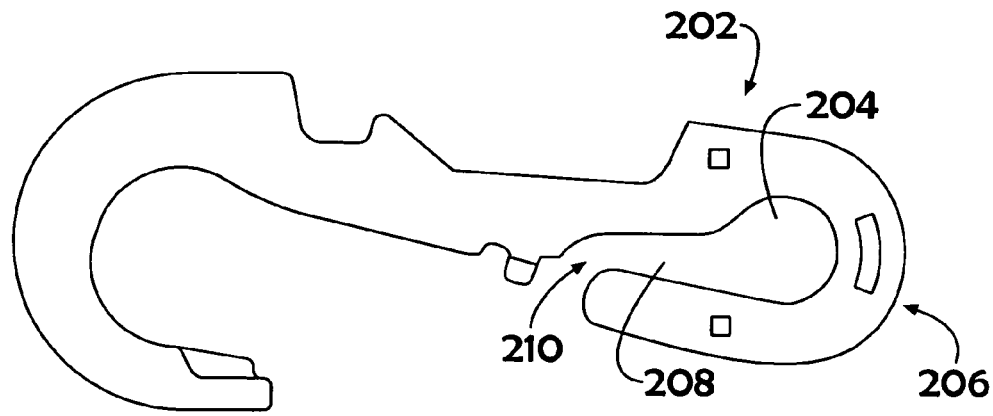
FIG. 3 is a top, plan view of a body member for use in a snap-hook in accordance with the invention.
Figure 4:
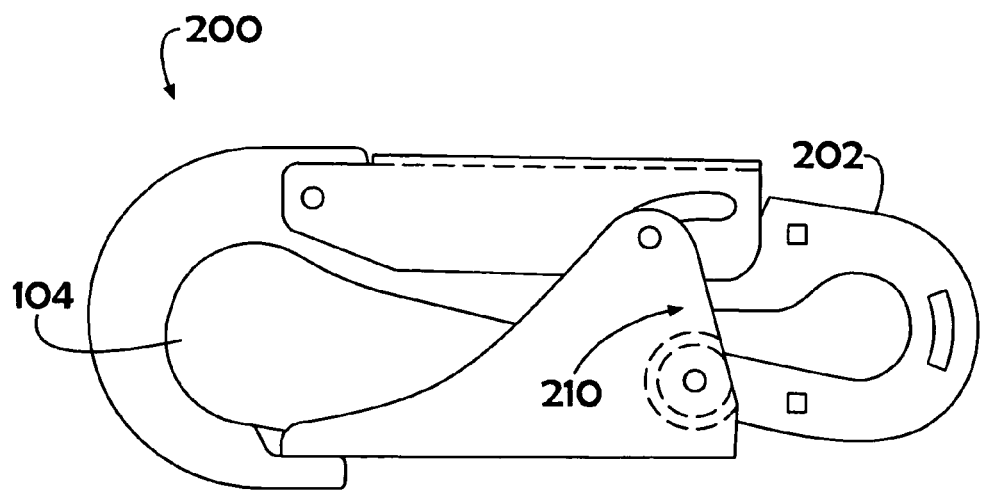
FIG. 4 is a top plan view of a snap-hook in accordance with the invention incorporating the body portion of FIG. 3.

Referring now also to FIGS. 3 and 4, there are shown top plan views of a body member 202 and a complete snap-hook assembly 200, respectively, both in accordance with the present invention.

Body member 202 differs significantly from body member 102. While body member 102 has a closed loop 106 formed at the proximal end 108 thereof, body portion 202 has an open loop portion 204 disposed at proximal end 206. Open loop portion 204 is connected to a slot 208 disposed at a rear side of open loop portion 204 and extending therefrom towards the distal end of body portion 202 and terminating at an opening 210. Opening 210 and slot 208 are sized and configured so that a loop 300a . . . 300c (FIGS. 5a, 5b, and 5c) may be passed into opening 210 and along slot 208 and into open loop portion 204 prior to assembly of the snap-hook 200 of the invention. This construction allows snap-hook 200 to be assembled with a wide variety of attachment configurations.

Figure 5A:
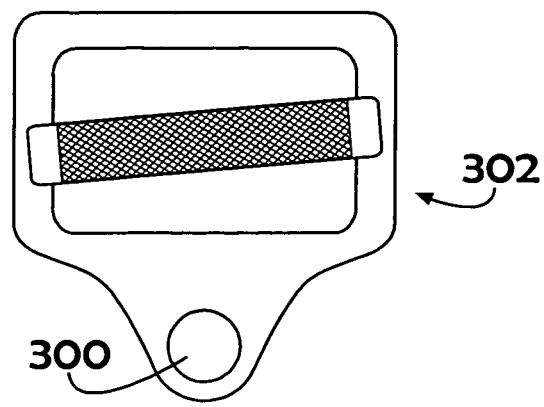
FIGS. 5a, 5b, and 5c are perspective pictorial views of a friction buckle, a solid ring, and a rope grab, respectively representing interchangeable attachment devices usable with the snap-hook of FIGS. 3 and 4 but not forming any part of the invention.
Figure 5B:
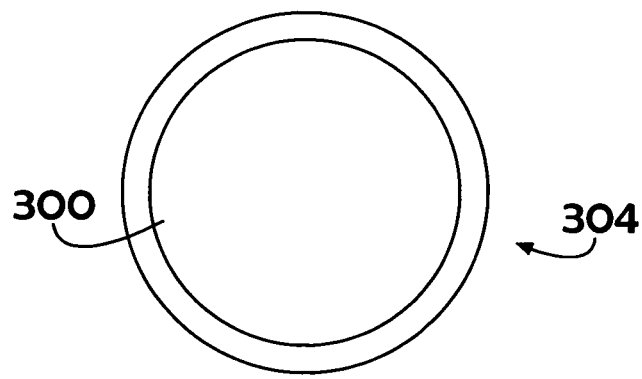
Figure 5C:
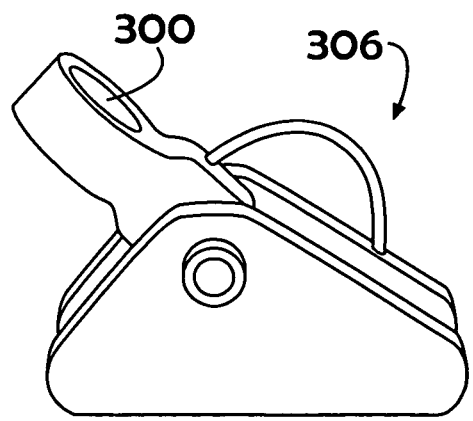

Referring now also to FIGS. 5a, 5b, and 5c, there are shown perspective pictorial views of a friction buckle 302, a solid ring 304, and a rope grab 306. Each attachment device 302, 304, 306 is equipped with a ring suitable for sliding through slot 208 and into open loop portion 204 of body member 202. However, attachment devices 302, 304, 306 form no part of the present invention and are shown merely to illustrate the intended use of snap-hook 200. Further, while a friction buckle 302, a solid ring 304, and a rope grab 306 have been shown for purposes of disclosure, those of skill in the art will comprehend that numerous other attachment devices may be substituted therefor to meet a particular operating circumstance or environment.

Conventional wisdom has limited the design of attachment loops (e.g., eyelet attachment 106 of snap-hook 100) to closed loops to maximize the strength of the attachment point. The novel design of body member 202, including open loop portion 204 and slot 208, uses material having inherent strength as well as careful size and orientation choices for slot 208 and opening 210 such that snap-hook 200 formed from body member 202 can meet all applicable safety standards currently in force.

While a particular locking snap-hook incorporating the novel body portion configuration has been chosen for purposes of disclosure, it will be recognized by those of skill in the art that the body portion design concepts may be applied to bodies for other types of snap-hooks or similar devices. Consequently, the invention is not considered limited to the particular locking snap-hook chosen for purposes of disclosure. Rather, the invention is considered to include any type of locking or non-locking snap-hook or any similar device that may benefit from including an interchangeable attachment apparatus.

Since other modifications and changes varied to fit particular operating requirements and environments will be apparent to those skilled in the art, the invention is not considered limited to the examples chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. A linkless, locking snap-hook, comprising:
   a) a body portion;
   b) a loop portion disposed at a proximal end of said body and a slot communicative therewith, said slot being directed from said loop portion toward a distal end of said body portion and terminating at an opening intermediate said proximal end and said distal end of said body portion, wherein said slot narrows as it extends from said loop portion toward said opening;
   c) a keeper pivotally movable between first and second terminal positions with respect to said body, said keeper defining a keeper grip member depressible with respect to said body in order to function as part of a release mechanism, said keeper positioned in blocking relation at said opening when in said first and second terminal positions and while in all positions between said first and second terminal positions;
   d) an eye loop, wherein said eye loop is at least partially formed by said body and said keeper, and further wherein said eye loop extends from the distal end of said body portion toward the proximal end of said body;
   e) first biasing means adapted to bias said keeper against pivotal movement with respect to said body; and
   f) a locking grip member pivotable about said body and depressible with respect thereto, said locking grip member being pivotally attached to said body and forming in conjunction with said keeper grip member said release mechanism.

2. In a snap-hook comprising a body portion having a keeper pivotably movable between first and second terminal positions with respect to said body, said keeper defining a keeper grip member depressible with respect to said body in order to function as part of a release mechanism; a spring adapted to bias said keeper against pivotal movement with respect to said body; an eye loop at least partially formed by said body and said keeper and extending from a distal end of said body portion toward a proximal end of said body; and a locking grip member pivotable about said body and depressible with respect thereto, the improvement comprising a loop portion disposed at the proximal end of said body portion and a slot communicative therewith, said slot being directed from said loop portion toward the distal end of said body portion and terminating at an opening intermediate said proximal end and said distal end of said body portion, wherein said slot narrows as it extends from said loop portion toward said opening, whereby an interchangeable attachment apparatus is selectively attached to said loop portion;

wherein said spring is disposed between said keeper and said body, and wherein said keeper is positioned in blocking relation at said opening when in said first and second terminal positions and while in all positions between said first and second terminal positions.

3. A body for a snap-hook, comprising:
a) means for retaining a keeper attached to said body for pivotal movement relative thereto between first and second terminal positions;
b) a keeper mechanism operatively attached to said means for retaining a keeper and movable between an open orientation and a closed orientation;
c) means for retaining an interchangeable attachment mechanism formed in said body, said means for retaining an interchangeable attachment mechanism comprising a loop portion disposed proximate a first end of said body and a slot communicative therewith, said slot being directed from said loop portion toward an opposite end of said body and terminating at an opening intermediate said first end and said second end of said body, wherein said slot narrows as it extends from said loop portion toward said opening, said means for retaining an interchangeable attachment mechanism further comprising an eye loop at least at least partially formed by said keeper and extending from the distal end of said body portion toward the proximal end of said body; and
d) a locking grip member pivotable about said body and depressible with respect thereto, said locking grip member being pivotally attached to said body and forming a release mechanism in conjunction with said keeper/gate;
wherein said keeper mechanism comprises a first biasing means, and
wherein said keeper is positioned in blocking relation at said opening when in said first and second terminal positions and while in all positions between said first and second terminal positions.

* * * * *